Patented July 22, 1930

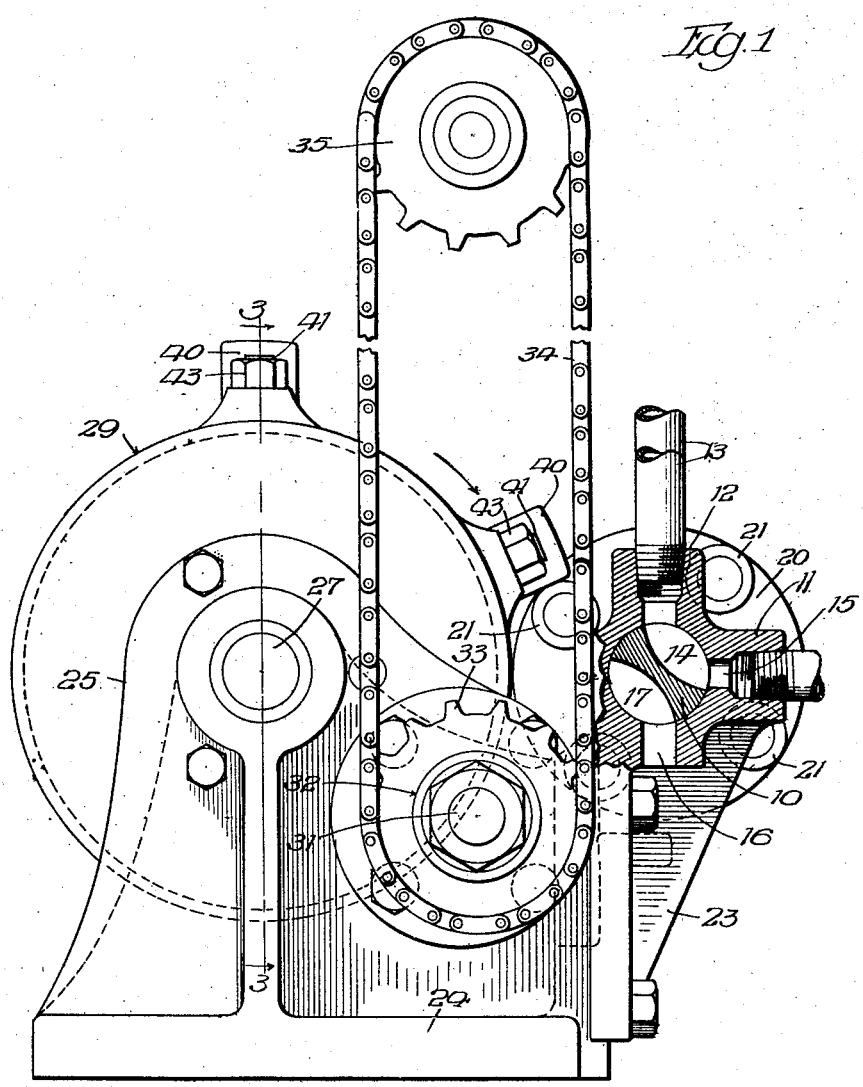

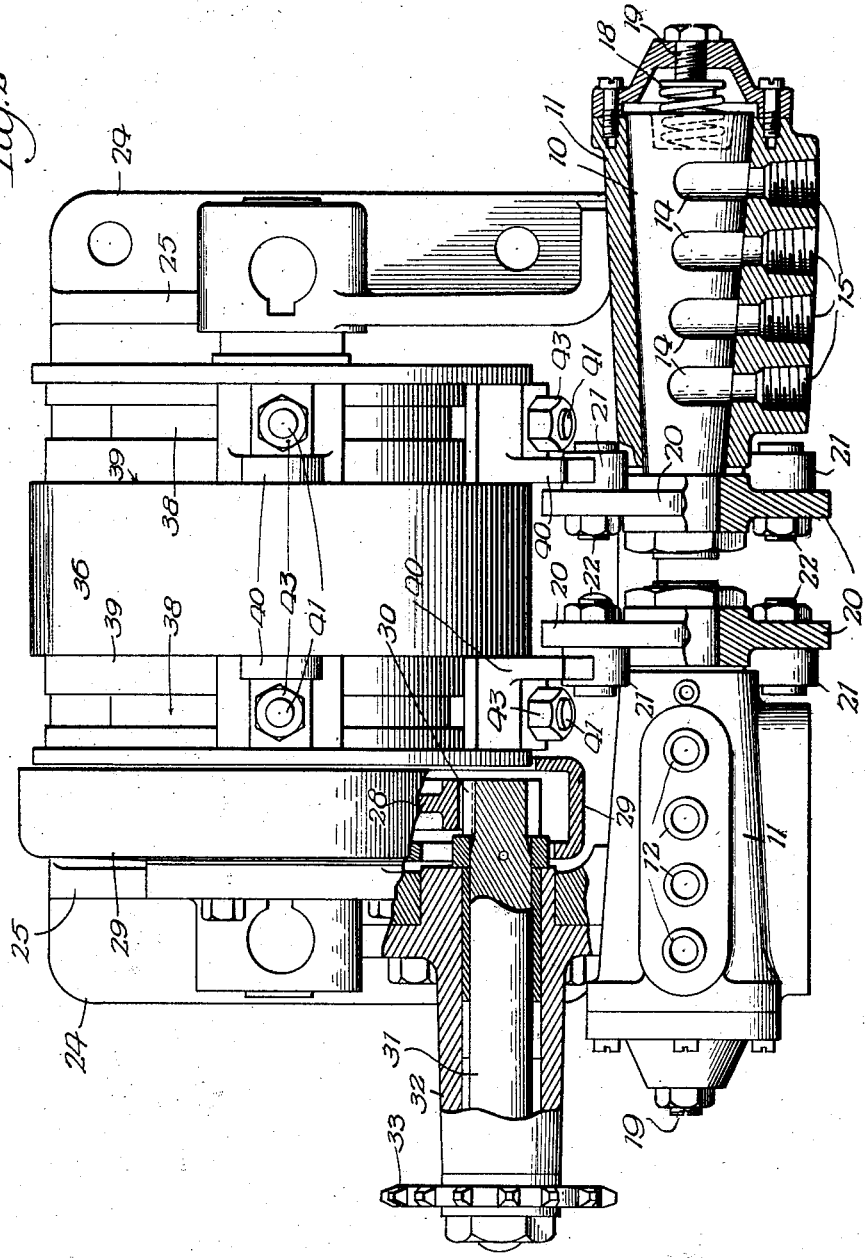

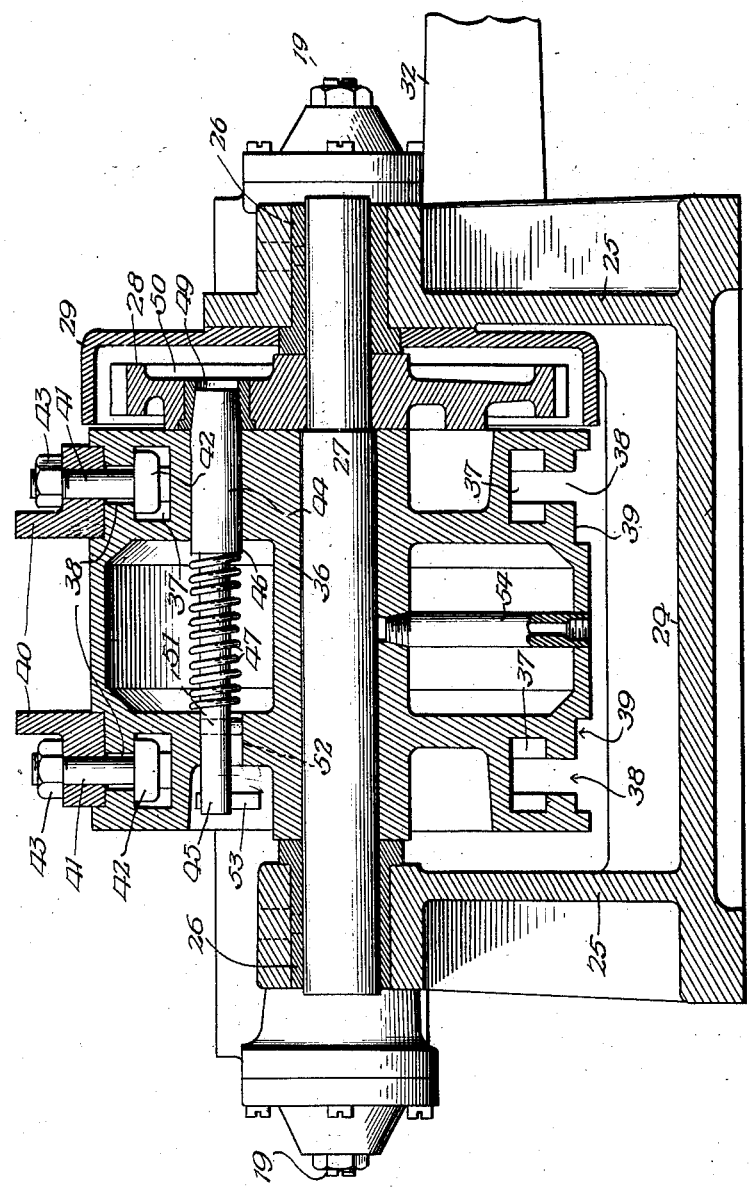

1,771,188

UNITED STATES PATENT OFFICE

OLOF G. NILSON AND RUDOLPH W. GLASNER, OF CHICAGO, ILLINOIS, ASSIGNORS TO MARQUETTE TOOL & MANUFACTURING CO., OF CHICAGO, ILLINOIS, A CORPORATION OF ILLINOIS

VALVE-OPERATING MECHANISM

Original application filed May 14, 1923, Serial No. 638,774. Divided and this application filed March 3, 1924. Serial No. 696,468.

This invention relates to improvements in valve operating mechanism particularly adapted though not necessarily limited in its use for controlling the direction of flow or pressure of fluids, and one of the objects of the invention is to provide improved mechanism of this character including means whereby the valve may be actuated at predetermined intervals in the cycle of operation of the mechanism, and means whereby the time of operation of the valve with respect to the cycle of operation of the mechanism may be varied.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view partly in elevation, partly in section and partly broken away of a valve and the operating mechanism therefor, constructed in accordance with the principles of this invention.

Figure 2 is a top plan view of Figure 1, with parts omitted, partly in section and with parts broken away.

Figure 3 is a sectional view taken on line 3—3, Figure 1.

This application is a division of our original application Serial Number 638,774, now Patent Number 1,516,979.

Referring more particularly to the drawings, the device is shown constructed to operate two valves 10, and as the construction of the valves and the operating mechanism therefor is the same, the description of one will apply equally as well to them both.

The valve 10 is preferably of a two-way construction and is arranged within a housing 11, having ports 12, any desired number of which are provided and to which ports are connected suitable pipes 13. The valve 10 is provided with passages 14 which are individual to the ports 12 and are also individual to ports 15, which latter also lead from the casing 11, so that when the valve 10 assumes the position shown in Figure 1, one of the ports 12 will be in direct communication with the port 15 through the respective passage 14 in the valve.

The casing 11 is also provided with a plurality of ports 16 of the same number as the ports 12 and 15. The valve 10 is also provided with passages 17 individual to the ports 16, so that when the valve 10 assumes a predetermined position each of the ports 15 will have direct communication with each of the ports 16, as will be understood.

The valve 10 may be provided with a tensioning device 18 controlled by a screw 19 for holding the valve in the proper position within the casing.

Connected with the valve 10 and adjacent one end of the casing 11 is a disc 20 of any desired diameter and this disc is provided with a plurality of anti-friction rollers 21, projecting laterally therefrom. These rollers 21 may be secured in position in any suitable manner such as by means of fastening bolts 22.

The valve casing may be supported in any desired or suitable manner preferably by means of a bracket 23 mounted upon a suitable base 24.

The base is preferably provided with uprights 25, having bearings therein preferably formed by suitable bushings 26 and journaled in the bearings is a shaft 27 to which is secured a gear 28 of any suitable diameter. Encompassing the gear 28 is a housing 29 and arranged within the housing so as to mesh with the gear 28 is a pinion gear 30, the latter being secured to a shaft 31 journaled in a suitable bearing 32. This shaft 31 may be rotated in any suitable manner such as by means of a sprocket wheel 33 secured thereto. Passing over the sprocket wheel 33 is a sprocket chain 34, which also passes over a sprocket wheel 35, the latter receiving its motion from any suitable source to drive the chain 34 and thereby operate the sprocket wheel 33.

Loosely mounted upon the shaft 27 is a drum like structure 36, one end of which is disposed in close proximity to the gear 28 and the open side of the housing 29 for closing the latter. The drum is provided with grooves 37 extending circumferentially therearound. These grooves 37, one of which may be provided adjacent each end of the drum, are spaced from the periphery of the drum and are provided with reduced entrance openings 38 extending through the periphery of the drum. The periphery of the drum adjacent the openings 38 is preferably recessed as at 39 to form seats for tappets 40, the base of which tappets are adapted to enter and fill the seats 39. Fastening bolts 41 are provided for holding the tappets in position with respect to the drum. These bolts 41 are preferably provided with heads 42 adapted to enter the grooves 37 with the body portions of the bolts passing through the openings 38 and through portions of the tappets, nuts 43 being connected with the ends of the bolts for securing the tappets in position.

These tappets 40 may be adjusted to any position about the periphery of the drum by loosening the nuts 43, after which the tappets may be moved about the periphery of the drum to the desired position and while the tappets are still within the seats 39. When the tappets have been properly positioned the nuts 43 may be tightened and the tappets will be firmly held against movement with respect to the drum.

Carried by the drum 36 is a pin 44 which preferably extends in a direction substantially parallel with the axis of the drum. The pin 44 is provided with a reduced portion 45 to form a shoulder 46 and encompassing the reduced portion 45 is a spring 47, one end of which engages the shoulder 46 and the other end engages a fixed portion of the drum and tends normally to project the extremity of the pin 44 beyond the end of the drum 36 to cause the extremity of the pin to enter a recess or opening 49 in the gear 28 and thereby lock the drum 36 for rotation with the gear 28. If desired a suitable bushing 50 may be provided in the opening 49. Carried by the reduced portion 45 of the pin is a lug or pin 51 which is adapted to slide within a keyway or guide 52 in the drum. The pin is provided with a suitable handle 53 by means of which the pin may be moved against the stress of the spring 47 to retract the end thereof from the opening 49 in the gear 28 to unlock the drum with respect to the gear. In order to maintain the pin retracted it is withdrawn to a sufficient extent that the lug or pin 51 carried thereby will pass out of the keyway or groove 52, after which the pin 44 may be rotated to a position that the lug or pin 51 will not enter the groove or keyway 52. When the pin is again released the elastic member 47 will cause the lug or pin 51 to engage a portion of the drum 36 and prevent the spring from projecting the end of the pin 44.

It will thus be seen that when the pin 44 is in the position shown in Figure 3, and when the gear 28 is rotated, the drum 36 with the tappets 40 will also be rotated. The anti-friction rollers 21 on the disc 20 carried by the valve 10 are arranged within the path of movement of the tappets 40, so that when the tappets are rotated in the direction indicated by the arrow in Figure 1, one of the tappets will engage one of the anti-friction rollers 21 to move the valve 10 one step of movement so as to connect either the ports 12 and 15 or the ports 15 and 16, according to the position of the valve 10 before it was moved. As the tappet 40 engages one of the anti-friction rollers 21 to rotate the valve 10, the advancing movement of the roller will cause the next tappet to assume a position in the path of the advancing tappet 40.

It will therefore be seen that as the drum 36 is rotated the valve 10 will be given an intermittent rotary movement by means of the tappets.

Obviously the tappets at the opposite ends of the drums may be so disposed with respect to each other that the valves may be operated simultaneously or intermittently or in any other predetermined relation with respect to each other, according to the position in which the tappets 40 are arranged about the periphery of the drum.

When it is desired that the valve 10 shall remain idle, the pin 44 is retracted in a manner as already set forth. This will disconnect the drum 36 from the gear 28 and the drum will remain idle. If the friction between the drum 36 and the shaft 27 is sufficient to cause the drum 36 to rotate to any extent with the shaft, when the drum is disconnected from the gear 28, the motion of the drum will be arrested when one of the tappets 40 engages one of the anti-friction rollers 21, the disc and valve 10 carrying the disc will be held against rotation by the tappets under these conditions by means of the friction created between the valve 10 and the wall of the valve casing.

If desired an oil channel or duct 54 may be provided through the drum for lubricating the shaft 27.

Obviously any number of tappets 40 may be provided and they may be so located about the periphery of the drum as to obtain any degree of motion that is desired for the valve 10.

While the preferred form of the invention has been herein shown and described, it is to be understood that various changes may be made in the details of construction and in the combination and arrangement of the several parts, within the scope of the claim, without departing from the spirit of this invention.

What is claimed as new is:—

A valve operating device embodying a rotatable element, spaced circumferential flanges extending beyond the periphery of said element, a recess in said element spaced below said periphery, there being a slot through and extending about said periphery forming communication between said recess and the space between said flanges, a tappet, the base of said tappet being angular in cross section and of a configuration to fit between and engage both of said flanges, said base resting upon the periphery of said element, said slot being of a width less than the width of said recess to form overhanging shoulders, a headed fastening device engaging said tappet, the said head being located in said recess and engaging in said shoulders, and means connected with said clamping device and cooperating with said head to clamp the tappet upon the periphery of the element, said tappet being maintained against axial rotation with respect to said element by said flanges.

In testimony whereof we have signed our names to this specification, on this 25th day of February, A. D. 1924.

OLOF G. NILSON.
RUDOLPH W. GLASNER.